United States Patent
Kogiso et al.

(12)
(10) Patent No.: US 6,568,093 B2
(45) Date of Patent: May 27, 2003

(54) ROTATION DETECTOR (75) Inventors: Katsuya Kogiso, Aichi (JP); Shinji Usui, Aichi (JP); Keiichi Shinohara, Anjo (JP); Yasuo Yamaguchi, Anjo (JP)

(73) Assignees: Kabushiki Kaisha Tokai Rika Denki Seisakusho, Aichi (JP); Aisin Aw Co., Ltd., Aichi-ken (JP)

( * ) Notice: Subject to any disclaimer, the term of this patent is extended or adjusted under 35 U.S.C. 154(b) by 0 days.

(21) Appl. No.: 09/817,609

(22) Filed: Mar. 26, 2001

(65) Prior Publication Data

US 2001/0025424 A1 Oct. 4, 2001

(30) Foreign Application Priority Data

Mar. 28, 2000 (JP) .......................... 2000-089725
Jan. 30, 2001 (JP) .......................... 2001-021714

(51) Int. Cl.[7] ................................. G01B 7/00
(52) U.S. Cl. ................... 33/1 PT; 33/708; 33/1 N; 33/706
(58) Field of Search ................. 33/1 PT, 1 N, 33/706, 708

(56) References Cited

U.S. PATENT DOCUMENTS

| 4,805,633 A | | 2/1989 | Kotani et al. | |
|---|---|---|---|---|
| 4,831,296 A | | 5/1989 | Nagaba | |
| 5,263,258 A | * | 11/1993 | Dobler et al. | 33/1 N |
| 5,811,968 A | | 9/1998 | Nakazawa et al. | |
| 5,831,596 A | | 11/1998 | Marshall et al. | |
| 6,016,605 A | * | 1/2000 | Hecht | 33/1 PT |
| 6,182,370 B1 | * | 2/2001 | Baur et al. | 33/1 PT |
| 6,212,783 B1 | * | 4/2001 | Ott et al. | 33/1 PT |
| 6,271,663 B1 | * | 8/2001 | Kanbe et al. | 324/207 |
| 6,360,449 B1 | * | 3/2002 | Steentjes | 33/1 PT |

FOREIGN PATENT DOCUMENTS

| DE | 4141000 A1 | * | 12/1991 | ......... 33/1 N |
|---|---|---|---|---|
| DE | 0 640 955 A1 | | 3/1995 | |
| JP | 57153263 | * | 9/1982 | ......... 33/1 PT |
| JP | 58060264 | | 9/1983 | |
| JP | 359027217 A | | 2/1984 | ......... 33/1 N |
| JP | 361124806 | * | 11/1984 | ......... 33/1 N |
| JP | 09311053 | | 2/1997 | |

* cited by examiner

*Primary Examiner*—Diego Gutierrez
*Assistant Examiner*—Travis Reis
(74) *Attorney, Agent, or Firm*—Crompton, Seager & Tufte, LLC

(57) ABSTRACT

A rotation detector resists magnetic disturbances from sources near the detector. The rotation detector includes a rotor on which iron magnetic path changing pieces are fixed at predetermined intervals. A first bias magnet and a first magneto-resistive element for detecting the flux of the first bias magnet oppose the magnetic path changing pieces. A magnetic guide plate is located to guide disturbing magnetic flux in predetermined directions. The disturbing magnetic flux thus fails to adversely affect the first magneto-resistive element.

21 Claims, 8 Drawing Sheets

ROTATION DETECTOR

BACKGROUND OF THE INVENTION

The present invention relates to a rotation detector, and more particularly, to a rotation detector that includes a magnetic sensing element.

Figure 15:
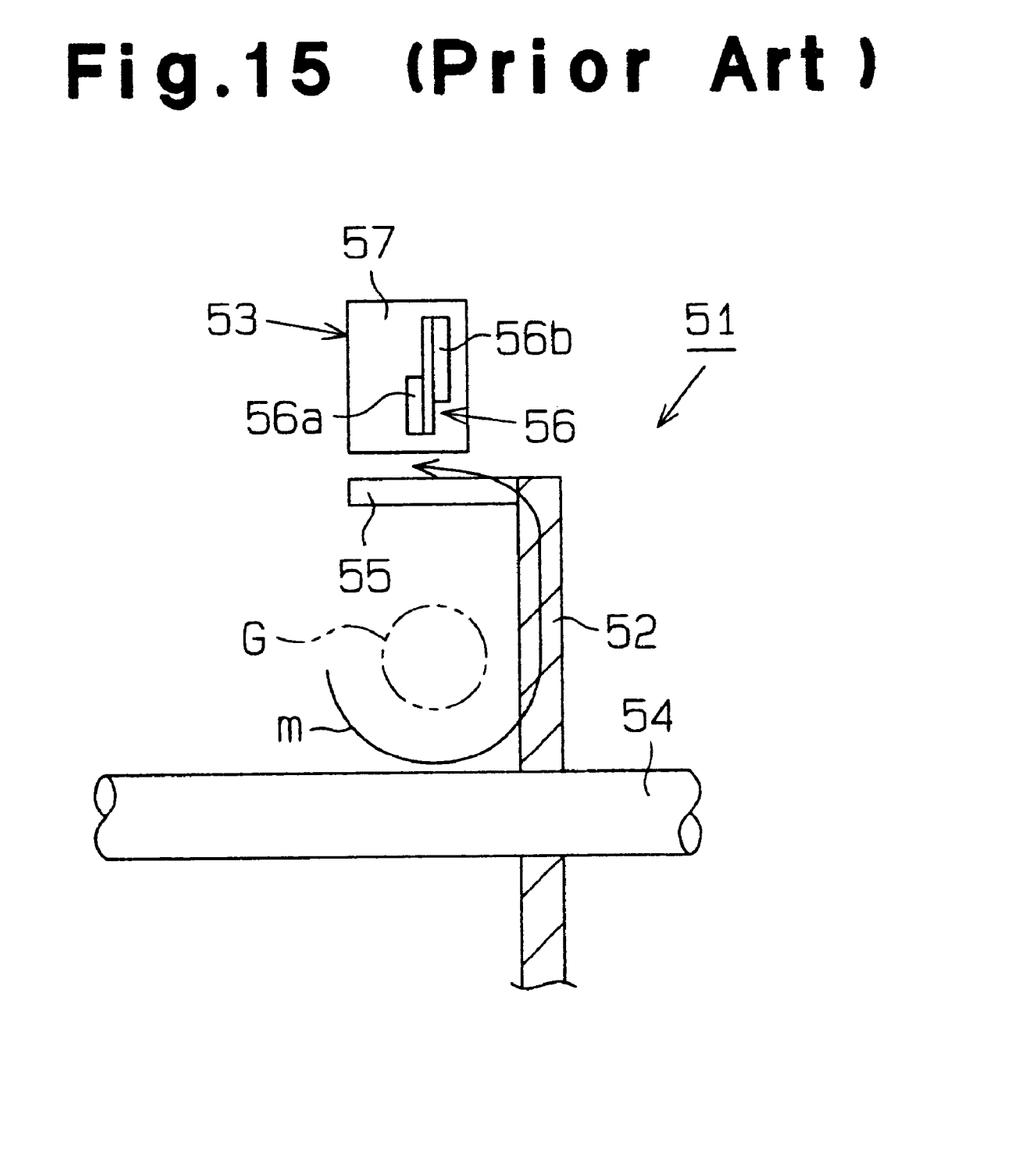
FIG. 15 is a partial cross-sectional view illustrating a main portion of a prior art rotary position sensor.

The applicant has proposed a rotation detector, or a rotation position sensor 51, as illustrated in FIG. 15. The rotation position sensor 51 has an iron rotating plate 52 and a sensor body 53. The rotating plate 52, which is in the shape of disk, is secured to a steering shaft 54 of a vehicle. The rotating plate 52 rotates together with the steering shaft 54 about the axis of the steering shaft. Extending from the peripheral edge of one surface of the rotating plate 52, a plurality of arcuate iron magnetic path changing pieces 55 are formed. Each piece 55 is coaxial with the shaft 54.

The sensor body 53 is located outside of and close to the magnetic path changing pieces 55. The sensor body 53 includes a plurality of magnetic sensing bodies 56 encapsulated by a resin molding material 57 and fixed to a fixing member, not shown. Each of the magnetic sensing bodies 56 includes a bias magnet 56b, which is opposite to the rotating plate 52 and oriented in a predetermined direction, and a magneto-resistive element 56a, which detects magnetic flux of the bias magnet 56b. The direction of the magnetic flux of each bias magnet 56b is changed when the associated magnetic path changing piece 55 passes a position corresponding to the magnetic sensing body 56 as the rotating plate 52 is rotated. The magneto-resistive element 56a detects changes in the direction of the magnetic flux of the associated bias magnet 56b. In this way, rotation is detected.

In the rotary position sensor 51 thus formed, however, if a disturbance source G such as a coil exists nearby, as indicated by broken lines in FIG. 15, disturbance magnetic flux m may be generated from the disturbance source G. Thus, when detecting the presence or absence of a magnetic path changing piece 55 between the bias magnet 56b and the axis of the shaft 54, the disturbance magnetic flux m may affect the rotating plate 52 and the magnetic path changing piece 55 and adversely affect the magnetic sensing bodies 56.

Specifically, even though a magnetic path changing piece 55 is located between the bias magnet 56b and the axis, the associated magneto-resistive element 56a may detect magnetic flux having a direction substantially similar to that of the flux in existence when the magnetic path changing piece 55 is not between the bias magnet 56b and the axis. Conversely, the magneto-resistive element 56a may detect magnetic flux having a direction substantially similar to that of the flux in existence when the associated magnetic path changing piece 55 is between the bias magnet 56b and the axis although the magnetic path changing piece 55 is not between the bias magnet 56b and the axis.

SUMMARY OF THE INVENTION

Accordingly, it is an objective of the present invention to provide a rotation detector that is capable of eliminating the influence of disturbance on magnetic sensing of a magnetic sensing element even if a disturbance source is positioned near the rotation detector.

In order to achieve this object, in accordance with the present invention, there is provided a rotation detector comprising: a circular rotating member; magnetic path changing pieces formed at predetermined intervals in a circumferential direction of the rotating member, each of the magnetic path changing pieces being made of a magnetic material; a magnetic sensing element for detecting magnetic flux of a magnet located in a predetermined orientation to the rotating member; and a shielding member covering at least a portion of the magnet and the magnetic sensing element, wherein the shielding member is made of a magnetic material.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS (First Embodiment)

A rotary position sensor of the first embodiment will hereinafter be described with reference to FIGS. 1 through 5.

Figure 1:
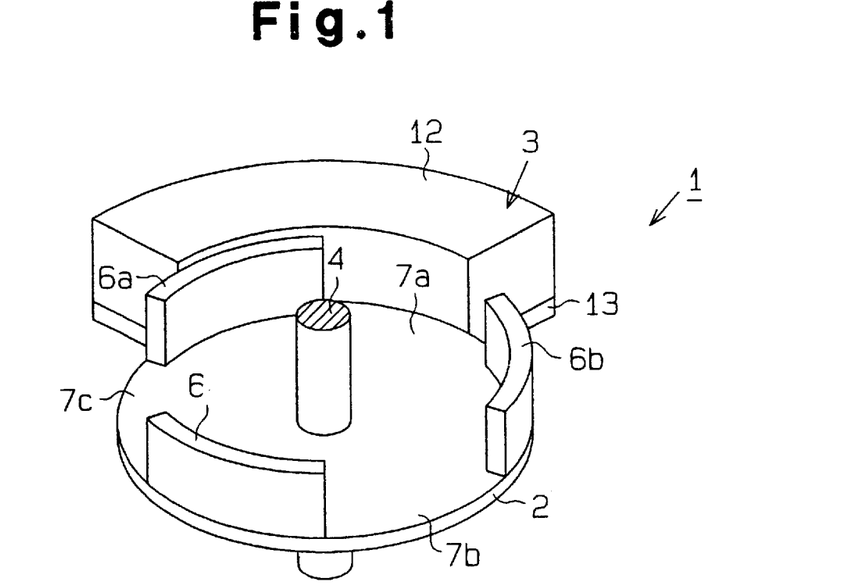
FIG. 1 is a perspective view illustrating a main portion of a rotary position sensor according to a first embodiment.

FIG. 1 is a perspective view illustrating a main portion of a rotary position sensor. The rotary position sensor 1, which serves as a rotation detector, includes a discoidal rotating plate, or rotor 2, made of iron, and a sensor body 3. As is well known, iron is a magnetic material (ferromagnetic material). The rotor 2 is rotated about an axis O (shown in FIG. 2) together with rotation of a steering shaft 4.

Figure 2:
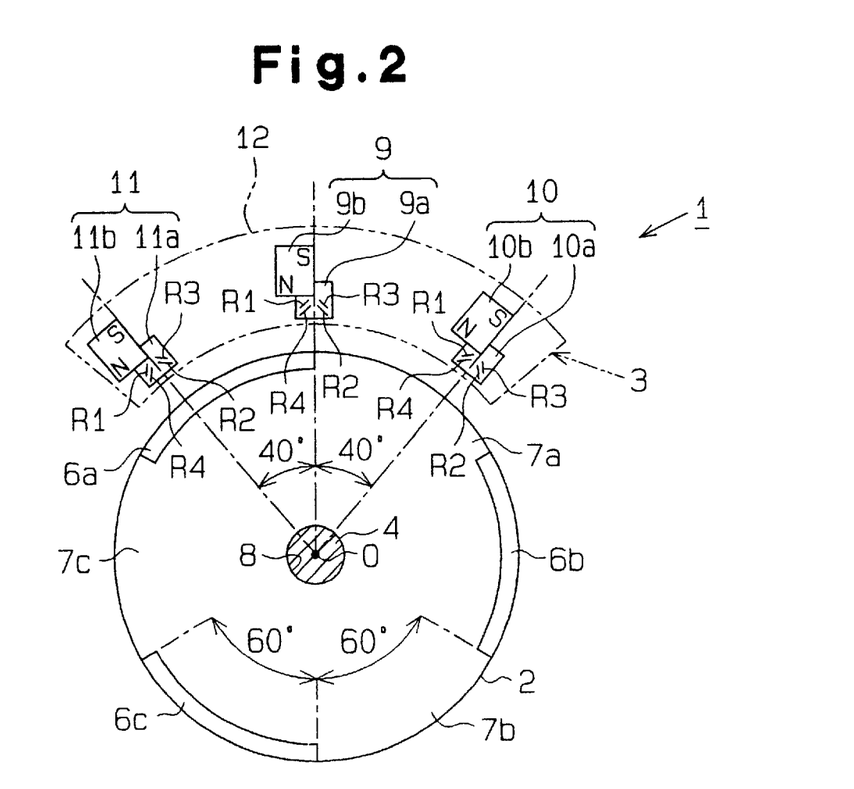
FIG. 2 is a plan view illustrating a positional relationship between a rotating plate and a magnetic sensing member in the first embodiment.

As illustrated in FIGS. 1 and 2, on a peripheral edge of a circular surface of the rotor 2, three arcuate, iron-based magnetic path changing pieces 6a–6c are fixed to the rotor 2 by soldering. The center of each arcuate magnetic path changing piece coincides with the axis O. Each of the magnetic path changing pieces 6a–6c is formed to extend over an angle of 60°, as viewed from the axial center O, from one end to the other. Also, the magnetic path changing pieces 6a–6c are formed such that the interval defined between each adjacent pair of the magnetic path changing pieces 6a–6c extends over an angle of 60° as viewed from the axial center O. Therefore, on the peripheral edge of the circular surface of the rotating plate 2, the magnetic path changing pieces 6a–6c and the spaces 7a–7c alternate by 60° intervals. In addition, the rotor 2 is formed with a center hole 8, in which the steering shaft 4 is fitted to fix the rotor 2 to the steering shaft 4.

The sensor body 3 is located outside of and close to the magnetic path changing pieces 6a–6c formed on the rotor 2. The sensor body 3 has three, i.e., first, second, and third magnetic sensing bodies 9–11, which are encapsulated by a resin molding material 12, and is held stationary by a fixing member, which is a magnetic guide plate 13, in this embodiment. The magnetic guide plate 13 is located closer to the rotating plate 2 than the first, second, and third magnetic sensing bodies 9–11.

The first magnetic sensing body 9 includes a first magneto-resistive element 9a, which serves as a magnetic sensing element, and a first bias magnet 9b, which serves as a magnet. The first bias magnet 9b is located to have the N-pole on the side of the axis O and the S-pole on the side facing away from the axis. The first bias magnet 9b is offset in the counterclockwise direction of FIG. 2 from a radial line extending from the axis O with respect to the first magneto-resistive element 9a.

The first magneto-resistive element 9a is a magneto-resistive element, the detected voltage of which changes depending on the direction of the magnetic flux Z (see FIG. 3) of the first bias magnet 9b. The first magneto-resistive element 9a includes four resistors R1–R4, the resistances of which change depending on the direction of the magnetic flux Z. As illustrated in FIG. 2, a group consisting of the two resistors R1, R4 is arranged in the same orientation, while a group consisting of the two resistors R2, R3 is arranged in the same orientation and orthogonal to that of the resistors R1, R4.

Figure 3:
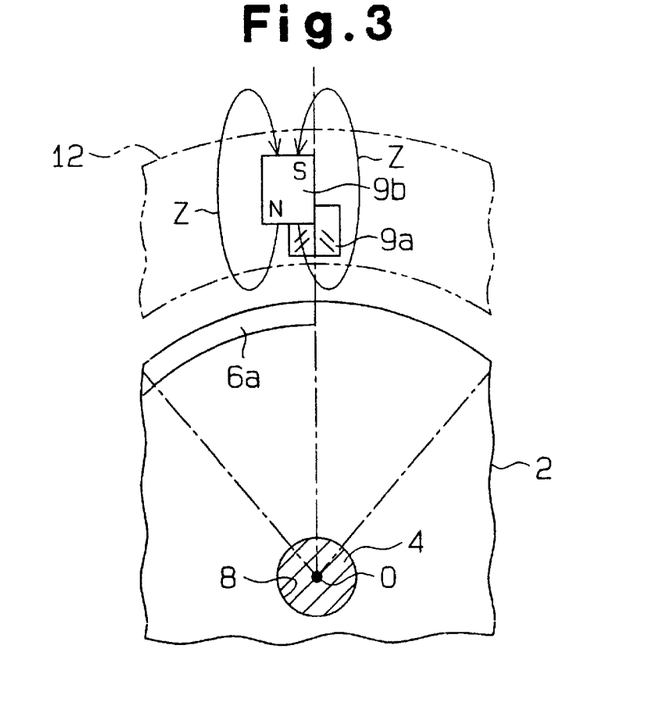
FIG. 3 is a partial enlarged view like FIG. 2.

In the first embodiment, the direction of the magnetic flux Z changes in a range from a point at which the direction of the magnetic flux Z is at a predetermined angle to a radial line extending from the axis O in the counter-clockwise direction to a point at which the flux Z is at a predetermined angle to the radial line in the clockwise direction, as illustrated in FIG. 3.

Though not shown, each of the resistors R1–R4 includes an Ni—Co thin film deposited on a substrate in a zigzag pattern, i.e., in a polygonal line pattern. The resistors R1–R4 are set to have the same value of resistance under the same temperature. The resistors R1–R4 have a temperature characteristic that exhibits an increased resistance as the ambient temperature rises. Preferably, the resistors R1–R4 have the same rate of change of resistance with respect to a change in temperature.

When the magnetic flux Z is oriented at the predetermined angle to the radial line in the counterclockwise direction, the resistors R1, R4 have a larger resistance, and the resistors R2, R3 have a smaller resistance. On the other hand, when the magnetic flux Z is oriented at the predetermined angle to the radial line in the clockwise direction, the resistors R1, R4 have a smaller resistance, and the resistors R2, R3 have a larger resistance. Therefore, the resistances of these resistors alternately change from a larger value to a smaller value in accordance with a change in the magnetic flux Z.

Figure 5:
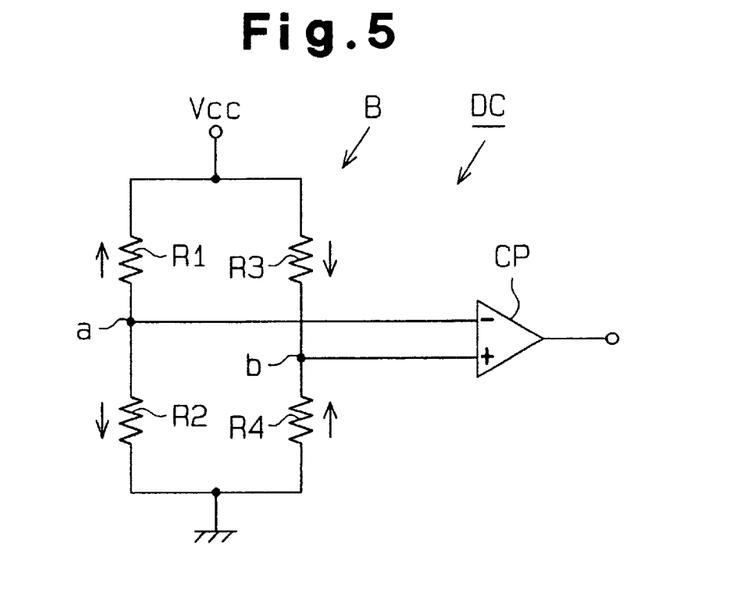
FIG. 5 is an equivalent circuit diagram of magneto-resistive elements.

The resistors R1–R4 are connected to form a four-terminal bridge circuit B, as illustrated in FIG. 5.

A connection point (median point) a of the resistors R1 and R2 is connected to a non-inverting input terminal of a comparator CP located on a substrate, while a connection point (median point) b of the resistors R3 and R4 is connected to an inverting input terminal of the comparator CP.

The comparator CP and the four-terminal bridge circuit B form a detector circuit DC.

The resistors R1, R4, which form part of the bridge circuit B of the detector circuit DC, have the following relationship with the first bias magnet 9b and the magnetic path changing pieces 6a–6c. When the rotor 2 has a positional relationship to the first bias magnet 9b like the relationship between the third bias magnet 11b and the rotor 2 shown in FIG. 2, i.e., when any of the magnetic path changing pieces 6a–6c is between the axial center O and the N-pole (hereinafter called the "inner side"), the magnetic flux Z is oriented at a predetermined angle to the radial line in the counter-clockwise direction. In this event, the voltage at the median point a of the four-terminal bridge circuit B is at the L level, or low level.

Also, the relative relationship between the first bias magnet 9b and the magnetic path changing pieces 6a–6c is defined in the following manner. When the relationship is like that of the second bias magnet 10b shown in FIG. 2b, i.e., when none the magnetic path changing pieces 6a–6c is at the inner side of the N-pole, the magnetic flux Z is oriented at a predetermined angle to the radial line in the clockwise direction. In this event, the voltage at the median point a of the four-terminal bridge circuit B is at the H level, or high level.

Further, in the relative relationship between the first bias magnet 9b and the magnetic path changing pieces 6a–6c, suppose that the first bias magnet 9b is first at the position of the first bias magnet 9b shown in FIG. 2. Subsequently, when the first bias magnet 9b passes from a position, at which none of the magnetic path changing pieces 6a–6c exists, over ends of the magnetic path changing pieces 6a–6c, the orientation of the magnetic flux Z changes from the predetermined angle to the axial line in the clockwise direction to the predetermined angle to the radial line in the counter-clockwise direction. In this event, the median point a of the four-terminal bridge circuit B outputs a voltage that falls from the H level to the L level.

Further, in the relative relationship between the first bias magnet 9b and the magnetic path changing pieces 6a–6c, when the first bias magnet 9b passes from a position, at which any of the magnetic path changing pieces 6a–6c exists, over ends of the magnetic path changing pieces 6a–6c, the orientation of the magnetic flux Z changes from the predetermined angle to the axial line in the counter-clockwise direction to the predetermined angle to the radial line in the clockwise direction. In this event, the median point a of the four-terminal bridge circuit B outputs a voltage that rises from the L level to the H level.

Thus, in this embodiment, the change of the orientation of the magnetic flux Z is detected at the time when the edges of the rotating magnetic path changing pieces 6a–6c pass through the bias magnets.

The second magnetic sensing body 10 has a second magneto-resistive element 10a, which serves as a magnetic sensing element, and a second bias magnet 10b, which serves as a magnet. The positional relationship between the second magneto-resistive element 10a and the second bias magnet 10b is identical to the positional relationship between the first magneto-resistive element 9a and the first bias magnet 9b. The second magneto-resistive element 10a and the second bias magnet 10b are located at positions spaced by an angular distance of 40° from the first magneto-resistive element 9a and the first bias magnet 9b, respectively, in the clockwise direction about the axial center O, as shown in FIG. 2.

The second magneto-resistive element 10a is a magnetic sensing element, the detected voltage of which changes depending on the direction of the magnetic flux Z of the second bias magnet 10b, as described with respect to the first magneto-resistive element 9a. The second magneto-resistive element 10a includes four resistors R1–R4, as illustrated in FIG. 5, and acts in a manner similar to the first magneto-resistive element 9a.

The resistors R1–R4 of the second magneto-resistive element 10a also form a four-terminal bridge circuit B similar to that of the first magneto-resistive element 9a. Further, the resistors R1–R4 of the second magneto-resistive element 10a form a second detector circuit DC together with a second comparator CP. This detector circuit DC and the bridge circuit B function in a manner similar to the detector circuit DC associated with the first magneto-resistive element 9a.

The third magnetic sensing body 11 includes a third magneto-resistive element 11a, which serves as a magnetic sensing element, and a third bias magnet 11b, which serves as a magnet. The positional relationship between the third magneto-resistive element 11a and the third bias magnet 11b is identical to the positional relationship between the first magneto-resistive element 9a and the first bias magnet 9b. The third magneto-resistive element 11a and the third bias magnet 11b are located at positions spaced by an angular distance of 40° from the first magneto-resistive element 9a and the first bias magnet 9b, respectively, in the counter-clockwise direction about the axial center O, as shown in FIG. 2.

The third magneto-resistive element 11a is a magnetic sensing element, the detected voltage of which changes depending on the direction of the magnetic flux Z of the third bias magnet 11b, as described with respect to the first magneto-resistive element 9a. The third magneto-resistive element 11a includes four resistors R1–R4, as illustrated in FIG. 5, and acts in a manner similar to the first magneto-resistive element 9a.

The resistors R1–R4 of the third magneto-resistive element 11a also form a four-terminal bridge circuit B similar to that of the first magneto-resistive element 9a. Further, the resistors R1–R4 of the third magneto-resistive element 11a form a third detector circuit DC together with a third comparator CP. This detector circuit DC and the bridge circuit B function in a manner similar to the detector circuit DC associated with the first magneto-resistive element 9a.

Figure 4:
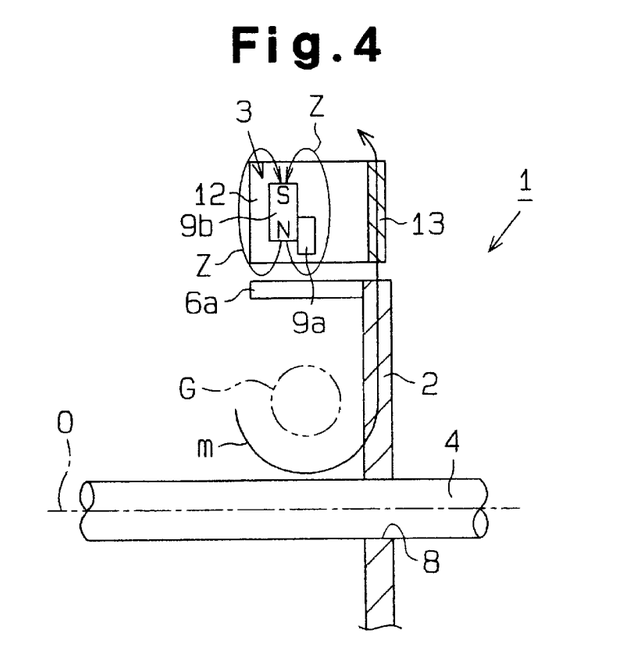
FIG. 4 is a partial cross-sectional view illustrating a main portion of the rotary position sensor of the first embodiment.

The magnetic guide plate 13 is arcuate, as shown in FIG. 1. As illustrated in FIGS. 1 and 4, the base of the resin molding material 12 conforms to the peripheral edge of the rotor 2. The base of the resin molding material 12 is adhered to the magnetic guide plate 13 with an adhesive. In other words, the magnetic guide plate 13 is substantially coplanar with the rotating plate 2. The magnetic guide plate 13 acts as a shielding member. Specifically, the magnetic guide plate 13 extends in a direction coinciding with the direction of the magnetic flux Z of the first, second, and third bias magnets 9b–11b. The magnetic guide plate 13 is formed of iron.

The operation of the rotary position sensor 1 according to the first embodiment will be described as follows.

As illustrated in FIG. 4, assume that a disturbance source G exists, for example, at the position indicated by a broken line, i.e., near the steering shaft 4 between the magnetic path changing pieces 6a–6c of the rotor 2 and the steering shaft 4. If a disturbing magnetic flux m is generated by the disturbance source G, a magnetic path is formed in the rotor 2 for the disturbing magnetic flux m to pass. The magnetic path extends through the rotor 2 in a substantially radial direction. The magnetic path, which is formed to the outer periphery of the rotating plate 2, is then guided by the magnetic guide plate 13 and formed through the magnetic guide plate 13 in a substantially radial direction (which is the direction of the magnetic flux Z generated by the first bias magnet 9b). Then, the magnetic path, which is formed to the end of the magnetic guide plate 13, further extends from the end of the magnetic guide plate 13 in a substantially radial direction.

As a result, most of the disturbing magnetic flux m is guided to the magnetic guide plate 13, and the formation of a magnetic path from the outer periphery of the rotating plate 2 to the magnetic path changing pieces 6a–6c is therefore suppressed. It is therefore possible to prevent the disturbing magnetic flux m from adversely affecting the magneto-resistive elements 9a–11a.

Also, as described above, since the disturbing magnetic flux m is guided by the magnetic guide plate 13 to pass along the direction of the magnetic flux Z generated by the bias magnets 9b–11b, the disturbing magnetic flux m will not adversely affect the magnetic flux Z of the bias magnets 9b–11b.

As appreciated, according to the rotary position sensor 1 of the first embodiment, the following advantages are provided.

(1) In the first embodiment, the magnetic guide plate 13 is coplanar with the circular plate of the rotor 2. Also, the magnetic guide plate 13 is located closer to the rotor 2 than the magnetic sensing bodies 9–11. The base of the resin molding material 12 is adhered to the magnetic guide plate 13. Therefore, the magnetic guide plate 13 guides the disturbing magnetic flux m generated by the disturbance source G, and guides the disturbing magnetic flux m in the substantially radial direction of the rotor 2. As a result, the adverse affection of the disturbing magnetic flux m on the magneto-resistive elements 9a–11a is reduced. This makes it easier to detect the changes in the magnetic flux Z caused by the magnetic path changing pieces 6a–6c passing between the first bias magnets 9b–11b and the axial center O. Thus, the sensor body 3 can reliably detect the rotation of the rotating plate 2.

(2) Since the magnetic guide plate 13 of the first embodiment is formed of a magnetic material, the magnetic guide plate 13 guides the disturbing magnetic flux m generated by the disturbance source G in a direction in which the sensor body 3 is not adversely affected by the disturbing magnetic flux m.

(3) Since a disturbance source G can be located near the rotary position sensor 1, the freedom of design is increased for positioning parts in an assembly, not shown, that includes the rotary position sensor 1 as a component.

(4) In the first embodiment, the magnetic guide plate 13 serves as a support for supporting the sensor body 3 in addition to a guide plate 13 for guiding the disturbing magnetic flux m. Thus, the rotary position sensor 1 can reliably detect the rotation of the rotor 2 without increasing the number of parts, as compared with the rotary position sensor 51.

(Second Embodiment)

A second embodiment of a rotary position sensor will be described with reference to FIGS. 6 through 8. The rotary position sensors in the following embodiments including the second embodiment are modifications of the first embodiment, and components similar to those in the first embodiment are designated with the same reference numerals and are not described in detail. The following description centers on differences from the first embodiment.

Figure 6:
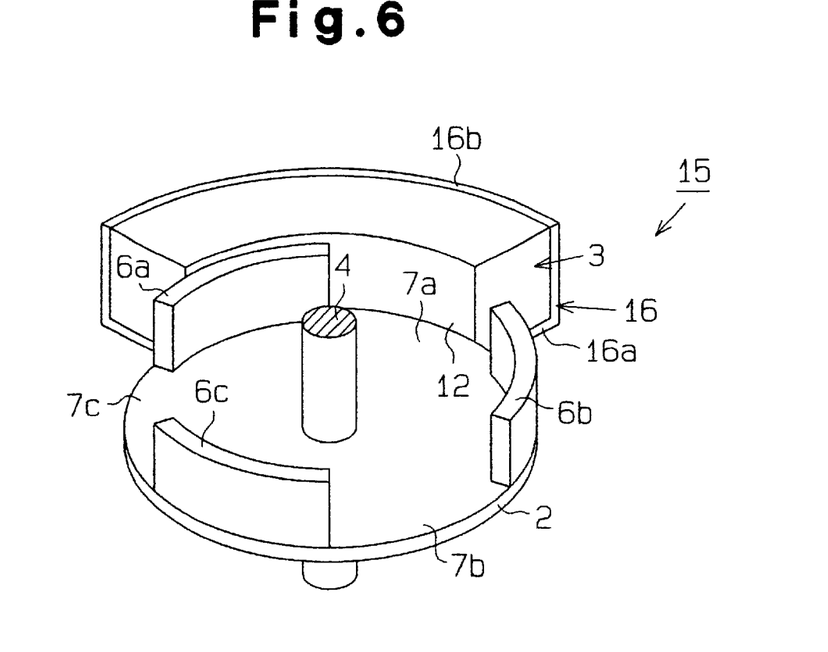
FIG. 6 is a perspective view illustrating a main portion of a rotary position sensor according to a second embodiment.

As illustrated in FIG. 6, a rotary position sensor 15, or rotation detector, according to the second embodiment has a sensor body 3 fixed to a magnetic guide body 16, which is made of iron and serves as a support. The magnetic guide body 16 also acts as a shielding member. The magnetic guide body 16 has a flat plate portion 16*a* and a curved portion 16*b*, which is formed integrally with the flat plate portion 16*a*.

The flat plate portion 16*a* is coplanar with the plate of the rotor 2. The entire base of the resin molding material 12 is adhered to the flat plate portion 16*a*. Also, the entire curved outer surface of the resin molding material 12 is adhered to the inner surface of the curved portion 16*b*. As illustrated in FIG. 8, the curved portion 16*b* is located such that the magnetic flux Z of first, second, and third bias magnets 9*b*–11*b* passes through the curved portion 16*b*.

In the following, the operation of the rotary position sensor 15 according to the second embodiment will be described.

Figure 7:
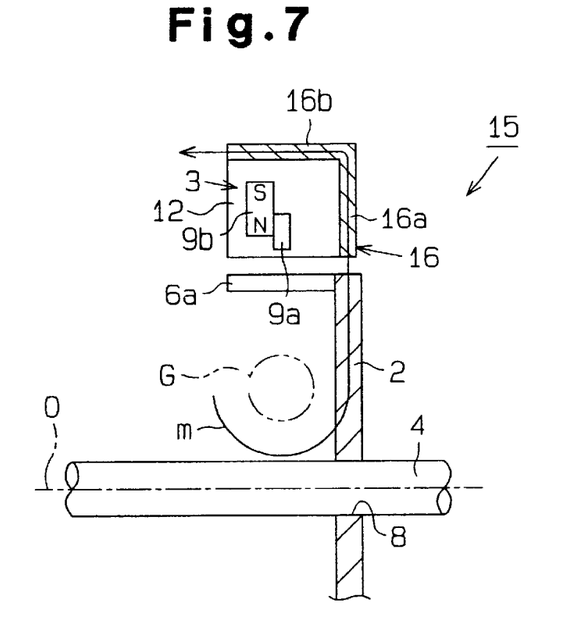
FIG. 7 is a partial cross-sectional view illustrating a main portion of the rotary position sensor of the second embodiment.

As illustrated in FIG. 7, the magnetic path of the disturbing magnetic flux m is formed through the rotor 2 and the flat plate portion 16*a* up to the outer end of the flat plate portion 16*a*. Specifically, the magnetic path extends to a joint between the flat plate portion 16*a* and the curved portion 16*b* and further extends through the curved portion 16*b* in the axial direction. Then, the magnetic path further extends from the outer end of the curved portion 16*b* in the axial direction, as shown. As a result, most of the disturbing magnetic flux m is guided to the magnetic guide plate 16, which inhibits the formation of a magnetic path from the outer periphery of the rotor 2 toward the magnetic path changing pieces 6*a*–6*c*.

Next, a change in the magnetic flux Z generated from the first bias magnet 9*b* of the first magnetic sensing body 9 due to the guide body 16 will be described.

Figure 8:
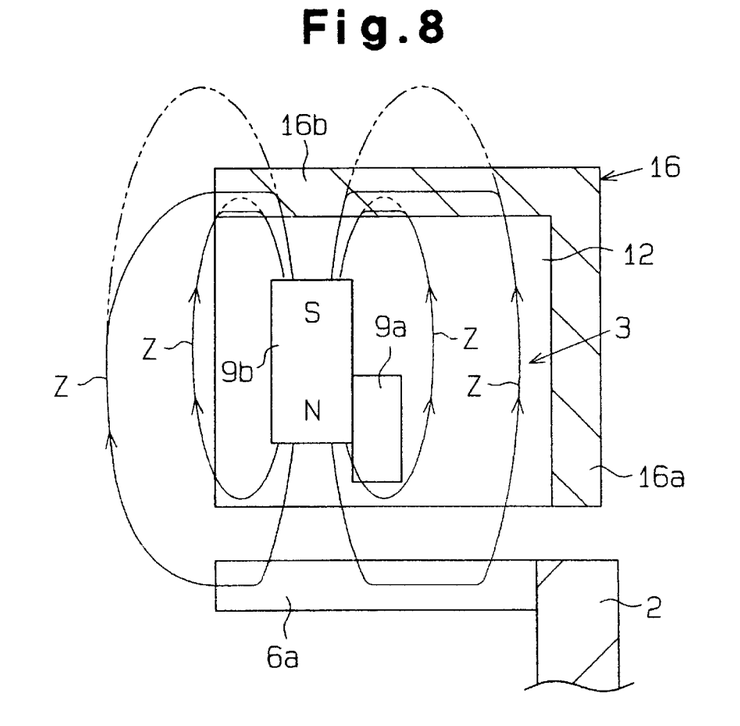
FIG. 8 is a partial enlarged cross-sectional view illustrating a main portion of the rotary position sensor of the second embodiment.

As indicated by a broken line in FIG. 8, the magnetic flux Z extending from the N-pole of the first bias magnet 9*b* and attempting to pass beyond the curved portion 16*b* to return to the S-pole is guided by the curved portion 16*b* to pass through the curved portion 16*b* and return to the S-pole.

For this reason, the existence of the curved portion 16*b* of the magnetic guide plate 16 reduces the space over which the respective magnetic flux Z extends, so that the magnetic flux Z near the first bias magnet 9*b* is more dense as compared with that existing when the magnetic guide body 16 lacks the curved portion 16*b*. Since the density of the magnetic flux Z received by the first magneto-resistive element 9*a* is increased, the sensing capability of the sensor, which senses the presence or absence of the magnetic path changing piece 6*a* and the magnetic path changing pieces 6*b*, 6*c*, is improved. A similar effect to that described with respect to the first magnetic sensing body 9 is similarly produced in the second magnetic sensing body 10 and the third magnetic sensing body 11.

The rotary position sensor 15 of the second embodiment has the following advantages in addition to the advantages (2)–(4) of the first embodiment.

(1) In the second embodiment, the flat inner edge of the plate portion 16*a* of the magnetic guide body 16 conforms to the outer edge of the rotor 2. The entire base of the resin molding material 12 is adhered to the flat plate portion 16*a*. Also, the inner surface of the curved portion 16*b* of the magnetic guide body 16 is adhered to the outer curved surface of the resin molding material 12. Therefore, the disturbing magnetic flux m generated by the disturbance generator G is guided by the magnetic guide body 16 and guided from the curved portion 16*b* of the magnetic guide body 16 in the axial direction.

As a result, the adverse effect of the disturbing magnetic flux m on the magneto-resistive elements 9*a*–11*a* is reduced. This makes it easier to detect changes in the magnetic flux Z caused by the magnetic path changing pieces 6*a*–6*c* passing between the bias magnets 9*b*–11*b* and the axis O. Thus, the sensor body 3 reliably detects the rotation of the rotor 2.

(2) In the second embodiment, the curved portion 16*b* of the magnetic guide body 16 is located such that the magnetic flux Z of the bias magnets 9*b*–11*b* passes through the magnetic guide body 16. As a result, the magnetic flux Z, which attempts to extend beyond the curved portion 16*b* of the magnetic guide body 16, is guided into the curved portion 16*b*, which reduces the extension of the magnetic flux Z. This increases the density of the magnetic flux Z passing through the magneto-resistive elements 9*a*–11*a*, which increases the accuracy of detecting the presence or absence of the magnetic path changing pieces 6*a*–6*c* between the bias magnets 9*b*–11*b* and the axis O.

(Third Embodiment)

In the following, a third embodiment of a rotary position sensor will be described with reference to FIGS. 9 through 11.

Figure 9:
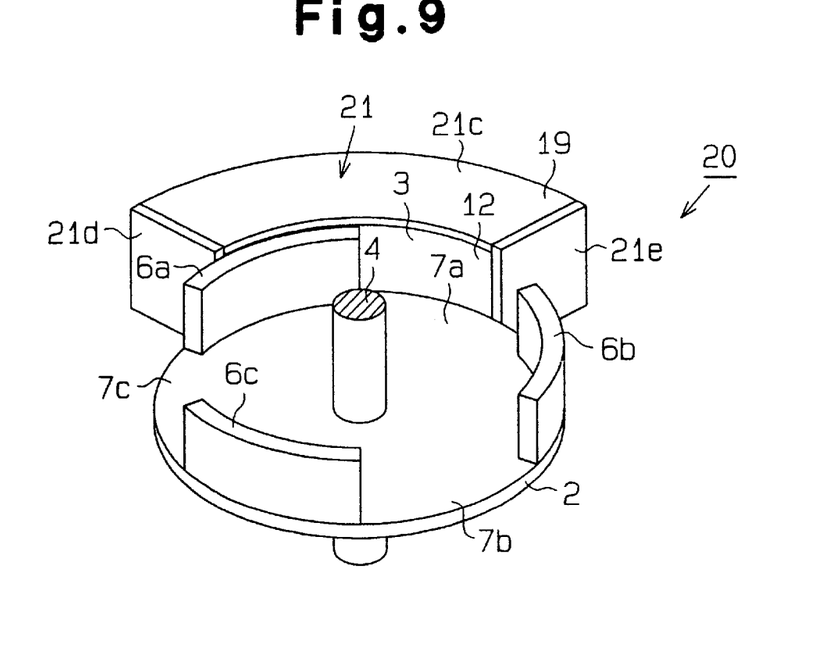
FIG. 9 is a perspective view illustrating a main portion of a rotary position sensor according to a third embodiment.

As illustrated in FIG. 9, a rotary position sensor 20, or rotation detector, according to the third embodiment, has a resin molding material 12 fixed to and supported by a magnetic guide body 21, which is made of iron and serves as a support. The magnetic guide body 21 also acts as a shielding member. The magnetic guide body 21 includes a channel portion 19 and end plates 21*d*, 21*e*. As illustrated in FIG. 10, the channel portion 19 includes a first flat plate portion 21*a*, a curved portion 21*b*, and a second flat plate portion 21*c*. An outer end of the first flat plate portion 21*a* is joined with a corresponding side of the curved portion 21*b*, and the opposite side of the curved portion 21*b* is joined with the outer end of the second flat plate portion 21*c*.

The ends of the resin molding material 12, which corresponds to the ends of the channel portion 19, are covered by end plates 21*d*, 21*e*, respectively, which are adhered to the resin material 12. The channel portion 19 and the end plates 21*d*, 21*e*, cover five surfaces of a sensor body 3. The inner surface of the resin material is uncovered, as shown in FIG. 10. As illustrated in FIG. 11, the curved portion 21*b* and the second flat plate portion 21*c* are located such that the magnetic flux Z of first, second, and third bias magnets 9*b*–11*b* passes through the second flat plate portion 21*c*.

Next, the operation of the rotary position sensor 20 of the third embodiment will be described. The description of the operation of the third embodiment will center on differences from the second embodiment.

Figure 10:
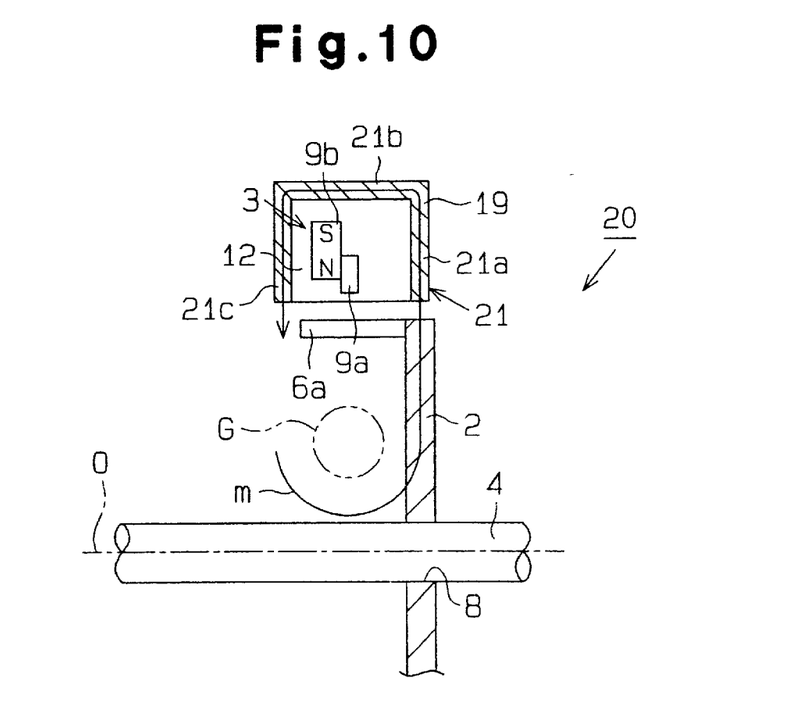
FIG. 10 is a partial cross-sectional view illustrating a main portion of the rotary position sensor of the third embodiment.

As illustrated in FIG. 10, a magnetic path of disturbing magnetic flux m extends through the rotor 2, the first flat plate portion 21a and the curved portion 21b. The magnetic path further extends through the second flat plate portion 21c toward the axis O. Further, the magnetic path extending to the distal end of the second flat plate portion 21c further extends from the toward the axis O. As a result, most of the disturbing magnetic flux m is guided to the magnetic guide body 21, which reduces the formation of a magnetic path from the outer periphery of the rotor 2 toward the magnetic path changing pieces 6a–6c.

Next, a change in the magnetic flux Z generated from the first bias magnet 9b of the first magnetic sensing body 9 due to the guide body 21 will be described.

Figure 11:
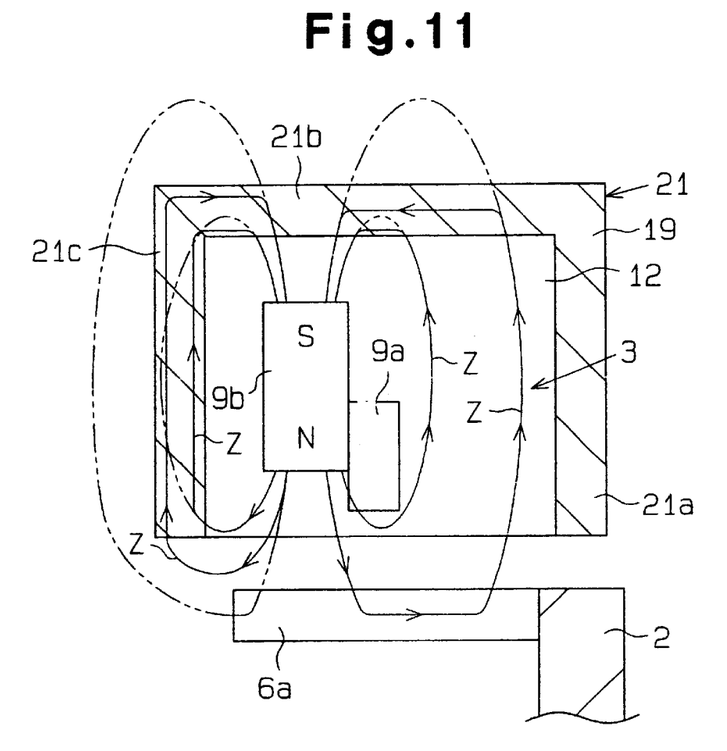
FIG. 11 is a partial enlarged cross-sectional view illustrating a main portion of the rotary position sensor of the third embodiment.

As indicated by a broken line in FIG. 11, the magnetic flux Z extending from the N-pole of the first bias magnet 9b toward the second flat plate portion 21c and attempting to pass beyond the second flat plate portion 21c to return to the S-pole is guided by the magnetic guide body 21. This causes the magnetic flux Z to pass through the flat plate portion 21c and the curved portion 21b and return to the S-pole. A similar effect occurs in the second magnetic sensing body 10 and the third magnetic sensing body 11.

The rotary position sensor 20 of the third embodiment has the following advantages in addition to the advantages (2)–(4) of the first embodiment and advantage (2) of the second embodiment.

(1) The magnetic guide body 21 of the third embodiment covers the outer periphery of the resin molding material 21 such that the surface facing the magnetic path changing piece 6a is uncovered. Thus, the first flat plate portion 21a of the magnetic guide body 21 is coplanar with the plate of the rotor 2. Therefore, the disturbing magnetic flux m generated by the disturbance source G is guided to the magnetic guide body 21 and further guided from the first flat plate portion 21c of the magnetic guide body 21 toward the axis O.

As a result, the adverse effect of the disturbing magnetic flux m on the magneto-resistive elements 9a–11a is reduced. This makes it easier to detect a change in the magnetic flux Z caused by the magnetic path changing pieces 6a–6c passing between the bias magnets 9b–11b and the axis O. Thus, the sensor body 3 can reliably detect the rotation of the rotating plate 2.

(Fourth Embodiment)

A fourth embodiment of a rotary position sensor will be described with reference to FIGS. 12 through 14.

In the fourth embodiment, the magnetic guide plate 13 is omitted.

Figure 12:
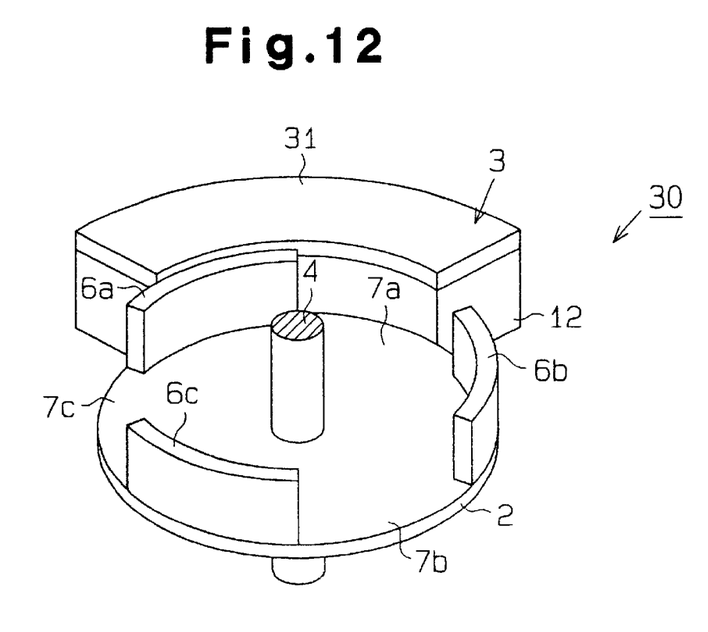
FIG. 12 is a perspective view illustrating a main portion of a rotary position sensor according to a fourth embodiment.

As illustrated in FIG. 12, a rotary position sensor 30, or rotation detector, according to the fourth embodiment, has a resin molding material 12 fixed to and supported by a magnetic guide plate 31, which is made of iron and serves as a support. The magnetic guide plate 31 also acts as a shielding member. The magnetic guide plate 31 is further from the rotor 2 than the magnetic sensing bodies 9–11.

Figure 13:
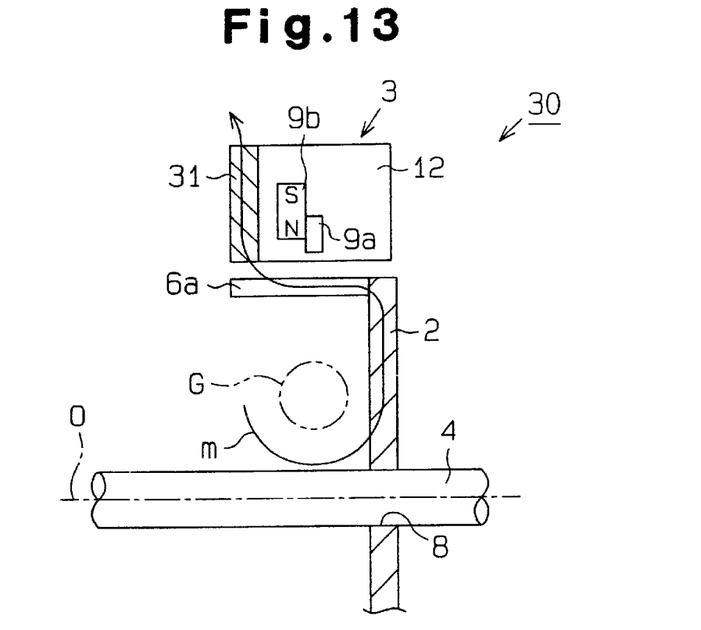
FIG. 13 is a partial cross-sectional view illustrating a main portion of the rotary position sensor of the fourth embodiment.

As illustrated in FIGS. 12 and 13, the magnetic guide plate 31 is arcuate. The magnetic guide plate 31 is located near the distal ends of the magnetic path changing pieces 6a–6c and is parallel to the plate of the rotor 2. The resin molding material 12 is adhered to the base of the magnetic guide plate 31.

In other words, the magnetic guide plate 31 is oriented in the direction of the magnetic flux Z of the bias magnets 9b–11b. The magnetic guide plate 31 is made of iron. Also, as illustrated in FIG. 14, the magnetic guide plate 31 is oriented such that the magnetic flux Z of the bias magnets 9b–11b passes through the magnetic guide plate 31.

Next, the operation of the rotary position sensor 30 of the fourth embodiment will be described. The description of the operation of the fourth embodiment will center on differences from the first embodiment.

As illustrated in FIG. 13, the magnetic path of the disturbing magnetic flux m extends through the rotor 2 to the distal ends of the magnetic path changing pieces 6a–6c. The magnetic path is then guided through the magnetic guide plate 31 in a substantially radial direction (which is the direction of the magnetic flux Z of the first bias magnet 9b). Then, the magnetic path further extends from the outer edge of the magnetic guide plate 31 in a substantially radial direction.

A similar effect is produced in the second and third magnetic sensing bodies 10, 11.

As a result, the disturbing magnetic flux m propagating from the rotor 2 to the magnetic path changing pieces 6a–6c is guided to the magnetic guide plate 31. For this reason, the disturbing magnetic flux m propagating from the magnetic path changing pieces 6a–6c to the magneto-resistive elements 9a–11a is reduced. It is therefore possible to prevent the disturbing magnetic flux m from adversely affecting the magneto-resistive elements 9a–11a.

Next, a change in the magnetic flux Z generated from the first bias magnet 9b of the first magnetic sensing body 9 due to the guide body 31 will be described.

Figure 14:
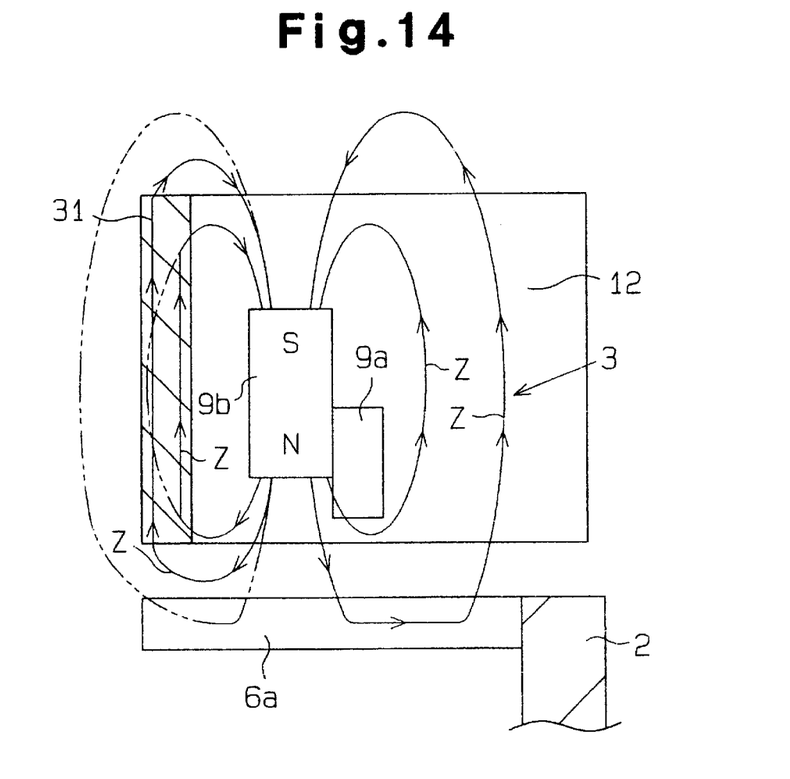
FIG. 14 is a partial enlarged cross-sectional view illustrating a main portion of the rotary position sensor of the fourth embodiment.

As indicated by a broken line in FIG. 14, the magnetic flux Z extending from the N-pole of the first bias magnet 9b and attempting to pass toward the magnetic guide plate 31 and beyond the magnetic guide plate 31 to return to the S-pole is guided by the magnetic guide plate 31. This causes the magnetic flux Z to pass through the magnetic guide plate 31 and return to the S-pole. A similar effect is produced in the second magnetic sensing body 10 and third magnetic sensing body 11.

The rotary position sensor 30 of the fourth embodiment has the following advantages in addition to the advantages (2)–(4) provided by the first embodiment.

(1) In the fourth embodiment, the magnetic guide plate 31 is located near the distal ends of the magnetic path changing pieces 6a–6c and along a plane parallel to the plate of the rotor 2. Also, the magnetic guide plate 31 is further from the rotating plate 2 than the magnetic sensing bodies 9–11. In addition, the resin molding material 12 is adhered to the base of the magnetic guide plate 31. Thus, the disturbing magnetic flux m generated from the disturbance source G propagates to the magnetic path changing pieces 6a–6c. Then, the disturbing magnetic flux m is guided from the distal ends of the magnetic path changing pieces 6a–6c to the magnetic guide plate 31 and further from the magnetic guide plate 31 toward the axis O.

As a result, the adverse effect of the disturbing magnetic flux m on the magneto-resistive elements 9a–11a is reduced. This makes it easier to detect a change in the magnetic flux Z caused by the magnetic path changing pieces 6a–6c passing between the bias magnets 9b–11b and the axis O. Thus, the sensor body 3 can reliably detect the rotation of the rotating plate 2.

The respective embodiments described above may be modified as follows.

While the magnetic guide plate 13, the magnetic guide body 16 and the magnetic guide body 21 in the respective embodiments described above are made of iron, they may be formed of nickel, cobalt or a magnetic alloys of these elements. Further, they may be formed of iron alloy.

While, in the structures of the respective embodiments described above, the bias magnets 9b–11b are oriented such that the N-pole is closer to the axis O than the S-pole, this relationship may be reversed.

In the third embodiment, the end plates 21*d*, 21*e* may be omitted.

In the first, second and fourth embodiments, the end plates 21*d*, 21*e* of the third embodiment may be provided.

The structure of the first embodiment may include the magnetic guide plate 31 of the fourth embodiment.

Therefore, the present examples and embodiments are to be considered as illustrative and not restrictive and the invention is not to be limited to the details given herein, but may be modified within the scope and equivalence of the appended claims.

What is claimed is:

1. A rotation detector for use on an apparatus wherein a source exists that may generate disturbance magnetic flux, the rotation detector including:
   a circular rotating member on which magnetic path changing pieces made of a magnetic material are fixed at predetermined intervals in the circumferential direction thereof;
   a magnetic sensing element for detecting magnetic flux of a magnet located in a predetermined orientation to the rotating member; and
   a shielding member covering at least a portion of the magnet and the magnetic sensing element to reduce adverse effect of the disturbance magnetic flux, the shielding member being made of a magnetic material, wherein the magnetic sensing element and the shielding member are located opposite to the source with respect to the magnetic path changing pieces.

2. The rotation detector according to claim 1, wherein the shielding member is located to extend in a direction of the flux of the magnet.

3. The rotation detector according to claim 1, wherein the shielding member is formed to accommodate the magnet and the magnetic sensing element and includes an opening that opposes the magnetic path changing pieces.

4. The rotation detector according to claim 1, wherein the shielding member extends in a direction that is parallel to the polar axis of the magnet, and the shielding member is located closer to the rotating member than the magnet.

5. The rotation detector according to claim 1, wherein the shielding member extends in a direction that is parallel to the polar axis of the magnet, and the shielding member is further from the rotating member than the magnet.

6. The rotation detector according to claim 1, wherein the shielding member comprises a plurality of shielding members, the shielding members extending in directions that are parallel to the polar axis of the magnet, and in that one of the shielding members is closer to the rotating member than the magnet, and another one of the shielding members is further from the rotating member than the magnet.

7. The rotation detector according to claim 1, wherein the shielding member is made of iron.

8. The rotation detector according to claim 1, wherein each magnetic path changing piece rises from the rotating member to be perpendicular to the rotating member, and the magnetic sensing element is located outside the magnetic path changing pieces.

9. The rotation detector according to claim 8, wherein the shielding member is located opposite to a radially extending part of the rotating member with respect to the magnetic sensing element.

10. A rotation detector for use on an apparatus wherein a source exists that may generate disturbance magnetic flux, the rotation detector including:
    a circular rotating member on which magnetic path changing pieces made of a magnetic material are fixed at predetermined intervals in the circumferential direction thereof;
    a magnetic sensing element for detecting magnetic flux of a magnet located in a predetermined orientation to the rotating member; and
    a shielding member covering at least a portion of the magnet and the magnetic sensing element to reduce adverse effect of the disturbance magnetic flux, the shielding member being made of a magnetic material, wherein the shielding member is located such that at least a portion thereof is positioned close to the rotating member and is substantially coplanar with a radially extending part of the rotating member, wherein the magnetic sensing element and the shielding member are located opposite to the source with respect to the magnetic path changing pieces.

11. The rotation detector according to claim 10, wherein the shielding member is located to extend in a direction of the flux of the magnet.

12. The rotation detector according to claim 10, wherein the shielding member is formed to accommodate the magnet and the magnetic sensing element and includes an opening that opposes the magnetic path changing pieces.

13. The rotation detector according to claim 10, wherein the shielding member extends in a direction that is parallel to the polar axis of the magnet, and the shielding member is located closer to the rotating member than the magnet.

14. The rotation detector according to claim 10, wherein the shielding member extends in a direction that is parallel to the polar axis of the magnet, and the shielding member is further from the rotating member than the magnet.

15. The rotation detector according to claim 10, wherein the shielding member comprises a plurality of shielding members, the shielding members extending in directions that are parallel to the polar axis of the magnet, and in that one of the shielding members is closer to the rotating member than the magnet, and another one of the shielding members is further from the rotating member than the magnet.

16. The rotation detector according to claim 10, wherein each magnetic path changing piece rises from the rotating member to be perpendicular to the rotating member, and the magnetic sensing element is located outside the magnetic path changing pieces.

17. The rotation detector according to claim 16, wherein the shielding member is located opposite to a radially extending part of the rotating member with respect to the magnetic sensing element.

18. A rotation detector for use on an apparatus wherein a source exists that may generate disturbance magnetic flux, the rotation detector including:
    a rotating circular member on which magnetic path changing pieces made of a magnetic material are fixed at predetermined intervals in the circumferential direction thereof;
    a plurality of magnetic sensing elements for detecting magnetic flux of a plurality of magnets located in a predetermined orientation to the rotating member; and a plurality of shielding members covering at least a portion of the magnets and the magnetic sensing elements to reduce adverse effect of the disturbance magnetic flux, the shielding members being made of a magnetic material, wherein the shielding members extend in directions that are parallel to the polar axis of the magnets, and wherein one of the shielding members is closer to the rotating member than the magnets, and another one of the shielding members is further from the rotating member than the magnets, and wherein the magnetic sensing elements and the shielding members are located opposite to the source with respect to the magnetic path changing pieces.

19. The rotation detector according to claim 18, wherein the shielding members are located to extend in a direction of the flux of the magnet.

20. The rotation detector according to claim 18, wherein the shielding members are formed to accommodate the magnets and the magnetic sensing elements and include openings that oppose the magnetic path changing pieces.

21. The rotation detector according to claim 18, wherein the shielding members are located such that at least a portion of each is positioned close to the rotating member and is substantially coplanar with a radially extending part of the rotating member.

* * * * *